US012251957B1

(12) United States Patent
Clark

(10) Patent No.: US 12,251,957 B1
(45) Date of Patent: Mar. 18, 2025

(54) OLD AND NEW TESTAMENT BIBLE ELEMENT BOOK MARKING SYSTEM

(71) Applicant: Carmille R Clark, Henderson, NV (US)

(72) Inventor: Carmille R Clark, Henderson, NV (US)

( * ) Notice: Subject to any disclaimer, the term of this patent is extended or adjusted under 35 U.S.C. 154(b) by 0 days.

(21) Appl. No.: 18/445,597

(22) Filed: Nov. 13, 2023

(51) Int. Cl.
*B42D 9/00* (2006.01)
*B65D 33/00* (2006.01)

(52) U.S. Cl.
CPC ........... *B42D 9/002* (2013.01); *B65D 33/004* (2013.01)

(58) Field of Classification Search
CPC ................................ B42D 9/002; B42D 9/001
See application file for complete search history.

(56) References Cited

U.S. PATENT DOCUMENTS 6,722,309 B1 * 4/2004 Ben-Dor ................ B42D 9/001 116/234
10,183,519 B1 * 1/2019 Landim Batista ... B43K 21/006
2003/0223804 A1 * 12/2003 Roca ....................... B42F 3/003 402/79
2006/0108788 A1 * 5/2006 Hendrickson .......... B42D 9/001 281/42
2009/0152859 A1 * 6/2009 Bharma ................... B42D 1/02 412/4
2009/0273889 A1 * 11/2009 Markley ................ B42D 9/001 361/679.01
2011/0081635 A1 * 4/2011 Ollivierre ............. B42D 9/001 434/245
2013/0127148 A1 * 5/2013 Cenzano ................ B42D 5/006 281/15.1
2015/0008661 A1 * 1/2015 Pencak .................... B42D 9/00 281/45

* cited by examiner

*Primary Examiner* — Derek J Battisti
(74) *Attorney, Agent, or Firm* — John Richardson

(57) ABSTRACT

The invention provides a unique and multiple purpose bible, book, manual book marking system for the use of the reader to more fully use and appreciate, for example, the Old and New Testament Bibles. The inventive concept discloses a unique means of securely attaching multiple book marks in both vertical and horizontal configurations.

4 Claims, 3 Drawing Sheets

OLD AND NEW TESTAMENT BIBLE ELEMENT BOOK MARKING SYSTEM

CROSS-REFERENCE TO RELATED TOPICS

Provisional Patent Application Filed Aug. 15, 2022 and Provisional Patent No. 63,474,406 Issued Nov. 11, 2022 with Confirmation Number 6634.

STATEMENT REGARDING FEDERALLY SPONSORED RESEARCH OR DEVELOPMENT

Not applicable.

REFERENCE TO SEQUENCE LISTING IN A TABLE, OR A COMPUTER PROGRAM LISTING COMPACT DISK APPENDIX

Not applicable.

BACKGROUND OF THE INVENTION

The present novel invention generally relates to an apparatus that provides a easy means for readily identifying elements of New and Old Testament Bibles to aid worshippers in church, synagogue, temple community settings, and individual at home prayer sessions, and to provide New and Old Testament Bible dates and anniversaries that can be associated with personal Family birthdates, and other commemorative dates.

There is a significant need for worshippers, students, and readers in general of complex literature, to readily identify by means of adaptable book marks, particular pages, and also specific text passages, for the reader quickly address document elements for reference. A readily accessible bookmark system provides the reader the means for later reference retrieval of particular document elements as required. In addition, a flexible book marking should also provide accessibility when the document is set aside and closed.

Currently available book marks are inefficient to provide specific needs as noted herein, and the instant invention provides an adjustable and adaptable book marking system that meets all needs for flexible book marking system.

DESCRIPTION OF THE RELATED PRIOR ART

Existing prior art bookmark examples, as disclosed in Independent Disclosure Form attached hereto, include U.S. Pat. No. 3,847,458—Nowak, U.S. Pat. No. 6,308,837—Bragg et al, U.S. Pat. No. 7,392,911—Stitchick et al, U.S. Pat. No. 7,500,574—Miller III, do not provide the flexibility to accommodate priority Bible passages that have associations with Family members.

For example, the instant invention provides personalized Bible texts for ready identification, and in addition an additional Bible cross reference identification associated with particular Family associations.

BRIEF SUMMARY OF THE INVENTION

This instant novel invention provides for a flexible and readily identified means of locating specific sections of Old and New sections of the Bible by means of bookmarks arranged in the vertical direction of the said Bibles and securely attached to the spine of such Bibles.

Further, the instant invention provides an additional identification means by means of bookmarks arranged in the horizontal direction again a securely attached to the Bible spine and depicting particular Bible passages associated with Family members.

Further additional features of the instant invention provides for a gift presentation bag, carton, container or equivalent carrier with selected Bible passages and decorative tissues with similar selected representative Bible passages.

The essence of the instant invention is to meet the basic requirements is disclosed in the following:

- a readily accessible set of vertical bookmarks identifying specific sections of the Old Testament Bible for example, including but limited to, Genesis, The Creation Account, Adam's Original State, The Results of the Fall, Exodus to Deuteronomy, The Mosaic Covenant, and Ten Commandments.
- the above bookmarks are characterized using specific color coded means using the 13 colors of the spectrum.
- further in a similar manner horizontal bookmarks identifying specific sections of the Old Testament Bible that have particular associations with Family members such as birthdates, anniversaries, and identified using specific color coded patterns using the 13 colors of the spectrum.
- a readily accessible set of vertical bookmarks identifying specific sections of the New Testament Bible for example, including but limited to Matthew, Mark, Luke, John, Acts of the Apostles, Romans, Colossians, and Revelation.
- the above bookmarks are characterized using specific color coded means using the 13 colors of the spectrum.
- further in a similar manner horizontal bookmarks identifying specific sections of the New Testament Bible that have particular associations with Family members such as birthdates, anniversaries, and identified using specific color coded patterns using the 13 colors of the spectrum.
- further, a presentation gift bag is providing with a selected Bible passage insignia, and gift wrap tissue paper with the same insignia imprint.

The various disclosed embodiments of the instant invention demonstrate the following significant user advantages over existing prior art:

- there is no existing prior art apparatuses that disclose the means to provide, for example, specific Bible section identifying bookmark arranged in a vertical direction.
- there is no existing prior art apparatuses that disclose the means to provide specific Bible section identifying bookmark arranged in a horizontal direction depicting particular Family associatio6 ns.
- color coded configurations of each vertical and horizontal sets of bookmarks are uniquely identified by colors, for example, of the spectrum and using particular identifying patterns.

BRIEF DESCRIPTION OF THE DRAWINGS

Various features, aspects, and advantages of the present invention will become apparent with reference to the following FIGS. 1 to 4.

LIST OF REFERENCE NUMBERS FOR THE ELEMENTS IN THE DRAWINGS

Figure 1:
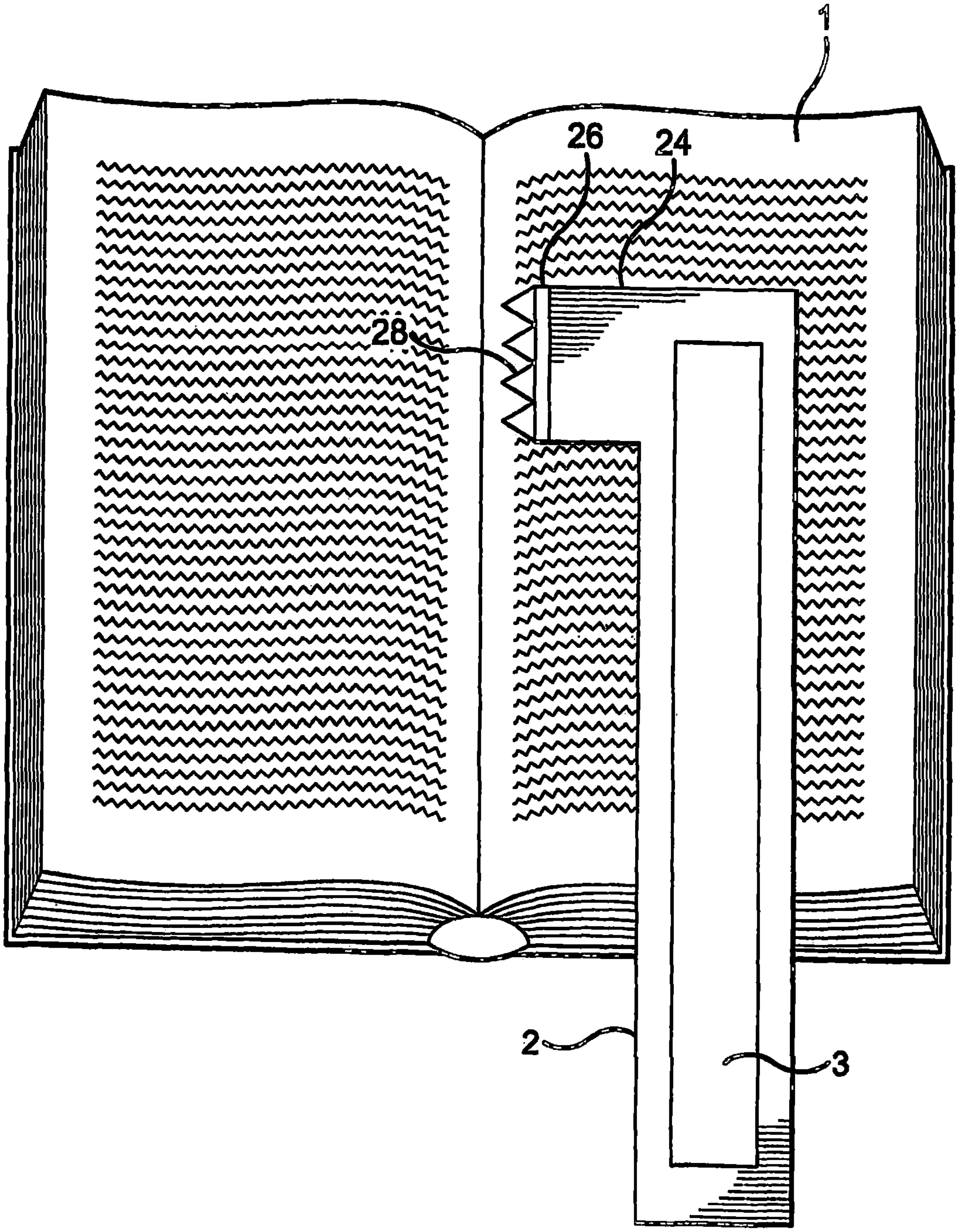
FIG. 1 shows a typical view of the inventive concept applied a Bible 1 with the arrangement of vertical rectangular shaped book marks 2 containing the specific Bible quotation 3.

FIG. 1 shows a Bible 1, with a vertical color coded bookmark 2 securely attached to the spine, containing a selected section identification passage statement 3, and in addition discloses specific features of the of the vertical configuration of bookmark 2 in the form of hardened end 26 and hardened teeth 28.

Figure 2:
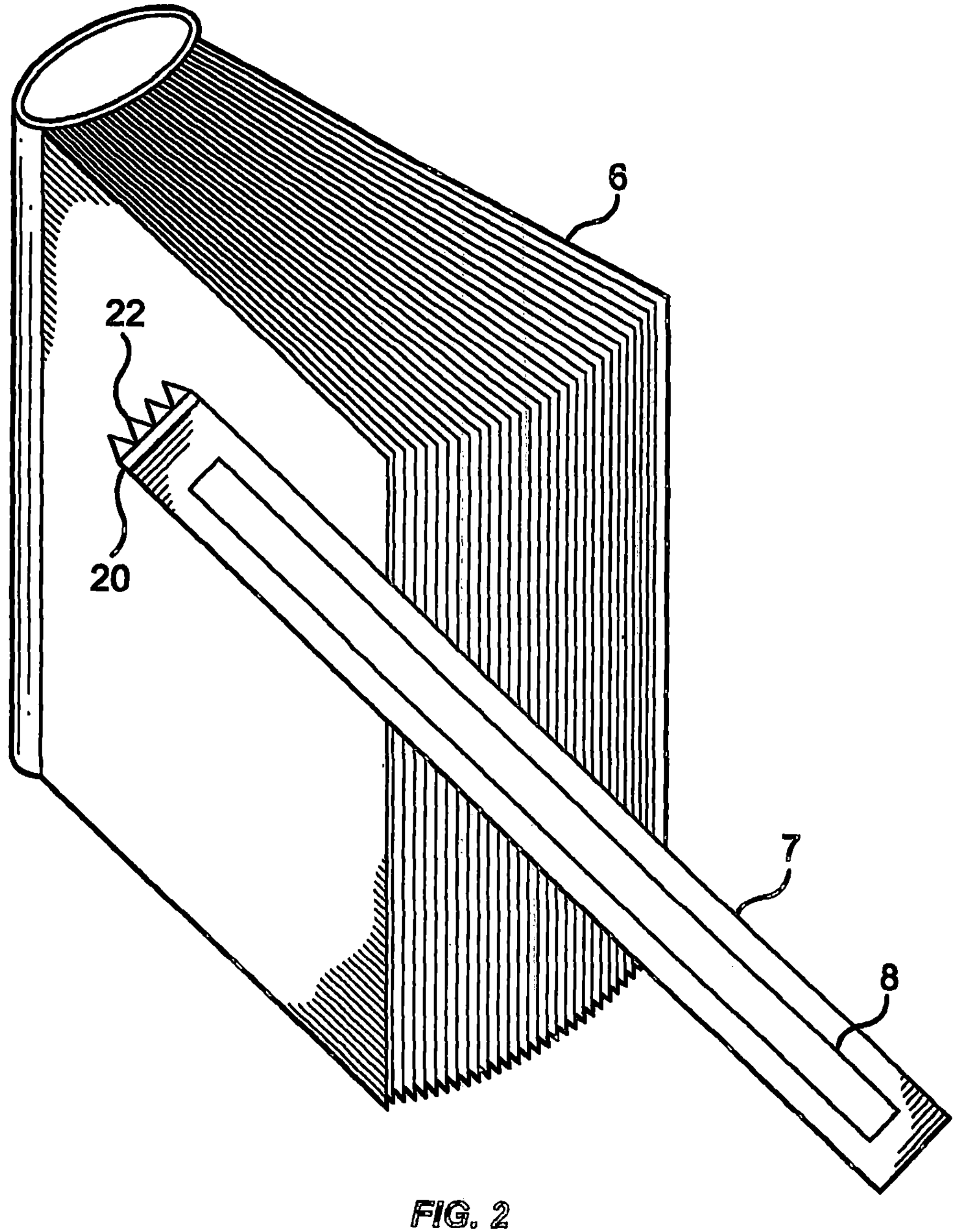
FIG. 2 shows a typical view of the inventive concept applied a Bible 6 with the arrangement of horizontal rectangular shaped book marks 7 containing the specific Family association identifier 8.

FIG. 2 shows a Bible 6, with a horizontal bookmark 7 securely attached to the spine and containing an identifying reference to a Family association, and in addition discloses specific features of the horizontal configuration in the form of hardened end 20, and hardened teeth 22.

Figure 3:
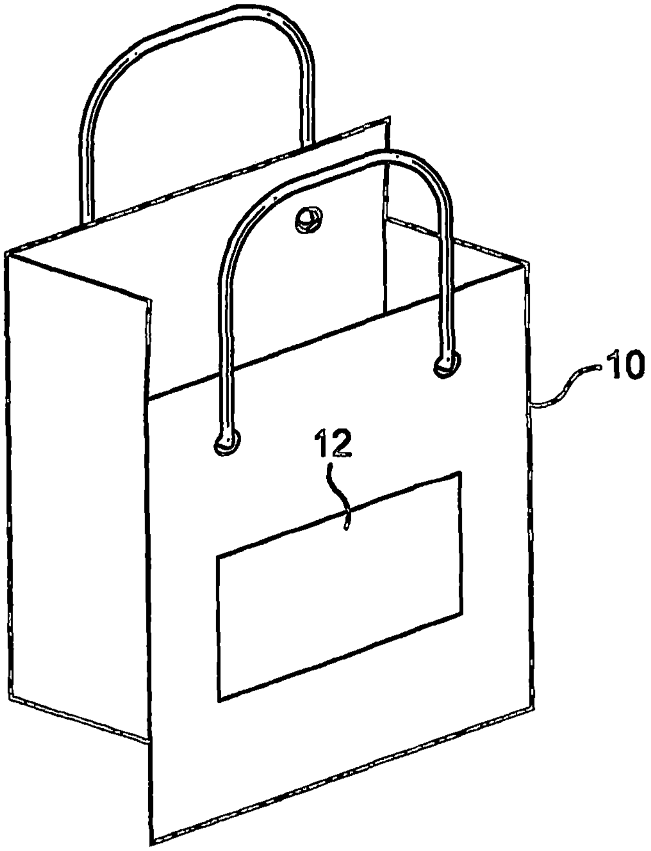
FIG. 3 shows the view of a gift presentation bag, container 10 with a selected Bible passage as an applique passage 12.

FIG. 3 shows a gift bag, container 10 with a selected Bible passage 12.

Figure 4:
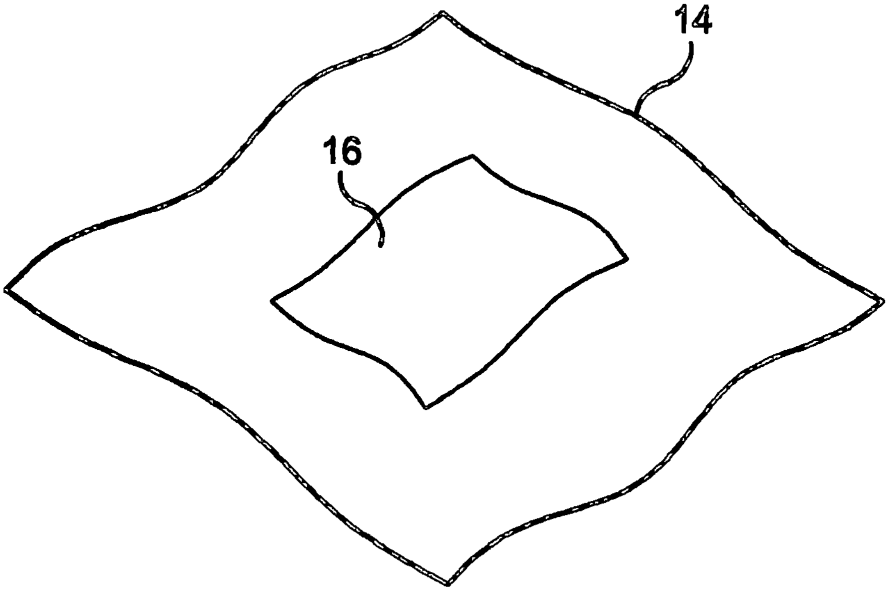
FIG. 4 shows a presentation tissue paper 14, with selected gift identifier 16.

FIG. 4 shows a gift tissue paper 14 with a presentation gift identifier 16.

DETAILED DESCRIPTION OF THE INVENTION

The basic elements and fundamental purpose the invention provides for:

1. A versatile means for facilitating the use of bookmarks arranged in multiple plane orientations to identify specific sections on Old or New Bibles for easy access of the reader to readily identify, for example, particular sections of the two Bibles.
2. The bookmarks or tabs provide the capability to identify specific places in particular text verses at the top of the verse and anywhere in between the top verse and ending verse.
3. In addition the invention provides the reader to associate specific sections of the two Bibles with members of the reader's Family.
4. The bookmark for each of the bibles are uniquely color coded for ready identification by the reader.
5. A uniquely configured gift bag with specifically identifiable presentation gift tissue paper.

The instant invention discloses in FIG. 1 the vertical orientation bookmark 1 the means of attaching the bookmarks 2 to the spine of bible, book, manual 1, showing the unique and novel feature of end fitting details 24, 26 resilient material and teeth 28 in the form of hardened material shaped in chevron, angular shapes to facilitate forcing the bookmark 2 into the bible, book 1 page integral holder spine.

In a further disclosure the instant invention shows in FIG. 2, horizontal orientation bookmark 7 the means of attaching the bookmarks 7 to the spine of bible, book, manual 6, showing the unique and novel feature of material hardened end 20 and material hardened teeth 22 shaped in chevron, serrated teeth shaped, and angular shapes to facilitate forcing the bookmark 7 into the document, such as, bible, book 6 page integral holder spine.

It should be noted that the instant invention provides a variety of materials for making the vertical 2, and horizontal 7 bookmarks including but not limited to, standard printed paper formats, tin foil, fiber glass, glass reinforced plastic.

In addition it will be noted that the book 20, 23, 26, and 28 marks 2 and 7 have specific end fitting details 20, 23, 26, and 28 that are formed integral with bookmarks 2, and 7, and provided in resilient and hardened materials that facilitates connecting of the book marks 2, 7 to the spine of the bible, book or manual disclosed herein.

The instant invention discloses means for connecting the end fitting details 20, 22, 26, 28, to the book marks 2, 7, 24, using conventional metallic material joints in the form of brazing, soldering, electric resistance welding, metal arc welding, arc welding, plasma arc welding, gas tungsten arc welding, tungsten inert gas welding, or laser beam welding, and fiber glass resin joint means.

Specifically, the disclosed end fitting section details 20, 23, 24, 26, and 28, are provided in a variety of material formats including but not limited to tin foil, carbon steel, stainless steel, fiber glass, reinforced hardened plastic, tungsten materials.

Further in the instant invention, it will be noted that the bookmarks 2, 7, are attached to the spines of bible, books, 1, 6, by means of forcing the bookmark end teeth details 22, 28, into the integral page attachment spines of bible, book, manual 1, 6.

The instant invention further discloses that the bookmark 2, 7, bookmarks end teeth features 22, and 28, are provided in multiple shapes including but not limited to chevron shaped teeth, angular shaped teeth, serrated shaped teeth, for the purpose of facilitating attaching the said bookmarks 2, 7, by forcing the teeth end features 22, 28, into the integral page attachment spines of bible, book, manual 1, 6, in a manner that secures the book mark to the spine of the bible, book or manual.

In a still further feature of the instant invention, FIG. 3 discloses a presentation gift bag, container, enclosure 10 with attached string type carrying handles and all made from conventional materials including such as plastic, cardboard paper, fiber glass, and formed with creases to facilitate packing, and storage disclosing one face 12 with a particular selected bible inscription.

The said inscription 12 is provided in the form of the bag 10 manufacture, or alternatively in the form of an attached, removable reusable applique.

In a still further disclosure of the instant invention FIG. 4 shows packing tissue 14 forming part of the gift bag, 10, and including a named, depicted gift identifier designation 16.

It should be recognized that the specification and the accompanying drawings are intended for the purposes of illustration only and should not be construed in a limiting sense for the disclosed exemplary embodiments. I should be noted that the instant inventive concept can be applied to other book marking applications such as telephone directories, yellow pages directories, and encyclopedias and similar multiple page documents.

FIGURES

FIG. 1—Disclosing vertical book mark orientation.

FIG. 2—Disclosing horizontal book ark orientation.

FIG. 3—Gift packaging embodiment.

FIG. 4—Gift packaging identification embodiment.

The invention claimed is:

1. A book marking apparatus providing a means for identifying a particular section, page, line, of a bible, book, or manual comprising: rectangular shaped book mark members attached to the spine of the particular part of the bible, book, or manual arranged in vertical orientation defining a specific part or section therein; the rectangular shaped book mark members provided in a stainless material; wherein attachment end fittings means for attaching the book mark members to the bible, book, or manual spine are provided with a material with hardened chevron shaped teeth in the form of a tungsten material, and hardened serrated shaped teeth in the form of a stainless material; the end fittings are joined by means of plasma arc welding and tungsten inert gas welding; and wherein the apparatus is contained in a presentation gift bag, container or enclosure disclosing one face with a particular selected bible inscription.

2. The rectangular shaped book mark according to claim 1 is provided a) book marking members arranged in multiple orientation planes, and, b) unique method for attaching book marking members to the spine of the bible, book, or manual in a manner that secures the book mark at a particular section of the bible, book, or manual.

3. A system of constructing a position-identifying bookmark for a plurality of documents, such as book, manuals, bibles, and comprising:

d) horizontal bookmark with planar sides capable of being firmly attached to spine of said book, manual, bible in a manner that identifies specific sections of document, and, e) vertical bookmark with planar sides capable of being firmly attached to spine of said book, manual, bible in a manner that identifies specific sections of document, and, f) the said bookmarks being capable of being fixed to spine of said documents by means of material hardened teeth in specific shapes.

4. The rectangular shaped book mark according to claim 3 is provided e) book marking members arranged in multiple orientation planes, and, f) unique method for attaching book marking members to the spine of the bible, book, or manual in a manner that secures the book mark at a particular section of the bible, book, or manual.

* * * * *